US012668161B2

(12) United States Patent
Gomez et al.

(10) Patent No.: US 12,668,161 B2
(45) Date of Patent: Jun. 30, 2026

(54) PANEL FOR A SEAT

(71) Applicant: Adient US LLC, Plymouth, MI (US)

(72) Inventors: John J. Gomez, Howell, MI (US);
Joseph Gasko, Commerce Township,
MI (US); Reinier Soliven, Oakland
Township, MI (US); **Xin Wei Jolene
Ng, Singapore (SG); Raza Bashir**,
Sterling Heights, MI (US)

(73) Assignee: Adient US LLC, Plymouth, MI (US)

( * ) Notice: Subject to any disclaimer, the term of this
patent is extended or adjusted under 35
U.S.C. 154(b) by 213 days.

(21) Appl. No.: 18/688,132

(22) PCT Filed: Sep. 12, 2022

(86) PCT No.: PCT/US2022/043196
§ 371 (c)(1),
(2) Date: Feb. 29, 2024

(87) PCT Pub. No.: WO2023/039237
PCT Pub. Date: Mar. 16, 2023

(65) Prior Publication Data
US 2024/0351492 A1 Oct. 24, 2024

Related U.S. Application Data

(60) Provisional application No. 63/243,583, filed on Sep.
13, 2021.

(51) Int. Cl.
| | |
|---|---|
| B60N 2/56 | (2006.01) |
| B60N 2/58 | (2006.01) |
| B60N 2/68 | (2006.01) |

(52) U.S. Cl.
CPC ............. B60N 2/5816 (2013.01); B60N 2/56
(2013.01); B60N 2/686 (2013.01)

(58) Field of Classification Search
CPC ......... B60N 2/56; B60N 2/5816; B60N 2/686
See application file for complete search history.

(56) References Cited

U.S. PATENT DOCUMENTS

| | | | | |
|---|---|---|---|---|
| 4,711,497 A | * | 12/1987 | Kazaoka | ................ B60N 2/686 |
| | | | | 297/DIG. 2 |
| 4,726,623 A | * | 2/1988 | Kazaoka | ................ B60N 2/686 |
| | | | | 248/419 |

(Continued)

FOREIGN PATENT DOCUMENTS

| | | |
|---|---|---|
| CN | 106470872 A | 3/2017 |
| CN | 208359982 U | 1/2019 |

(Continued)

OTHER PUBLICATIONS

European Patent Office, International Search Report and Written
Opinion in Application No. PCT/US2022/043196, dated Dec. 12,
2022, 10 pages, Rijswijk, Netherlands.

(Continued)

*Primary Examiner* — Philip F Gabler
(74) *Attorney, Agent, or Firm* — Marshall & Melhorn,
LLC

(57) ABSTRACT

A panel for a seat may have a retention portion with a
recessed seat cover groove. The groove may have at least
one tooth adapted to selectively retain a seat cover in the
groove. The panel may also have a plurality of recessed air
flow channels. The panel may also have a rear bolster. The
rear bolster may have a leading wall, a connecting wall and
a trailing wall. The leading wall may have a first clamp
portion and the trailing wall may have a second clamp
portion. The clamp portions may be adapted to selectively
receive a frame connection member. A seat having a seat
base panel and a seat back panel may have seat cover
grooves and air flow channels.

18 Claims, 9 Drawing Sheets

(56)     References Cited

U.S. PATENT DOCUMENTS

| | | | |
|---|---|---|---|
| 8,960,791 B2 * | 2/2015 | Dry ..................... B60N 2/986 297/452.42 |
| 9,873,362 B2 * | 1/2018 | Line .................. B60N 2/02246 |
| 10,279,714 B2 * | 5/2019 | Line .......................... B60N 2/62 |
| 10,532,679 B2 * | 1/2020 | Onuma ................ B60N 2/5657 |
| 10,596,939 B2 * | 3/2020 | Osterhoff ................. B60N 2/90 |
| 10,654,385 B2 * | 5/2020 | Onuma ............... B60N 2/0264 |
| 10,857,958 B2 * | 12/2020 | Onuma ............... B60N 2/5635 |
| 2013/0119715 A1 | 5/2013 | Medoro et al. |
| 2015/0246627 A1 | 9/2015 | Shimizu |
| 2017/0120789 A1 | 5/2017 | Kijima et al. |
| 2018/0290575 A1 | 10/2018 | Seibold |
| 2018/0304780 A1 | 10/2018 | Wlassuk |
| 2020/0224699 A1 | 7/2020 | Line et al. |
| 2021/0070205 A1 | 3/2021 | Mizoi |

FOREIGN PATENT DOCUMENTS

| | | |
|---|---|---|
| CN | 110740660 A | 1/2020 |
| CN | 113246823 A | 8/2021 |
| EP | 3632268 A1 | 4/2020 |
| JP | H01179600 U | 12/1989 |
| JP | 2012197032 A | 10/2012 |
| JP | 2018167630 A | 11/2018 |
| WO | 2019208555 A1 | 10/2019 |

OTHER PUBLICATIONS

Chinese National Intellectual Property Administration First Office Action and Search Report issued on Application No. 202280052462. 0, dated Mar. 16, 2026, 16 pages Beijing, China.

* cited by examiner

PANEL FOR A SEAT

FIELD

The presently disclosed subject matter relates to a panel for a seat, and more particularly to a panel for a seat for a vehicle.

BACKGROUND

Conventional seat, particularly seats employed in a vehicle, include a seat back structure connected to a seat base structure. A foam material is typically disposed on the seat back and seat base structures to provide cushioning and, therefore, comfort to an occupant of the seat system. Such seats, however, require an excessive amount of the foam material to provide a desired level of comfort to the occupant. These seats are disadvantageous because they are bulky, consume valuable space inside a passenger cabin of the vehicle and they are heavy. These seats could be considered in some cases to be more labor-intensive and costly to manufacture.

Certain conventional seats may be ventilated through the use of a blower or fan attached to additional, separate ductwork attached to the seat back structure and/or seat base structure. The ductwork adds thickness to the seats, as well as complexity, weight and cost. Thus, convention seats with these ventilation systems are also disadvantageous.

Accordingly, it would be desirable to produce a seat for a vehicle, which simplifies manufacturability, decreases costs and weight, and which makes efficient use of space, while maintaining comfortability.

SUMMARY

In one aspect, a panel for a seat may have a retention portion comprising a recessed seat cover groove. The groove may have at least one tooth adapted to selectively retain a seat cover in the groove. The panel may also have a plurality of air flow channels recessed into the main support portion. The panel may also have a rear bolster, comprising a leading wall, a connecting wall and a trailing wall. The leading wall may have a first clamp portion and the trailing wall has a second clamp portion, the clamp portions may be adapted to selectively receive a frame connection member therein.

In another aspect, the retention portion, air flow channels and the rear bolster may be one-piece, unitary and integrally formed.

In another aspect, the groove may have a plurality of pairs of opposed teeth adapted to retain the seat cover in the groove. The teeth may be adapted to elastically flex in a first direction for an attachment member to be located between them and then the teeth are adapted to flex in a second direction, opposite the first direction, to selectively retain the attachment member within the seat cover groove In another aspect, a member may extend inwardly from at least an inner surface of the connecting wall, and the member may have at least a partially complementary shape to the frame connection member.

In another aspect, the first clamp portion and the second clamp portion may have at least partially complementary shapes to the frame connection member.

In another aspect, the leading wall, the connecting wall and the trailing wall may have a larger radius measured from the frame connection member than a radius between the frame connection member and the first and second clamp portions.

In another aspect, two apertures may be defined between the leading wall and at least one rib and two additional apertures are defined between the rib and the trailing wall.

In another aspect, the seat cover groove may have a general U-shaped cross section, wherein a base of the seat cover groove may be located below a lower surface of the panel.

In another aspect, the plurality of air flow channels may be formed in part from walls extending downwardly from an upper surface of the main support portion.

In another aspect, the plurality of air flow channels may comprise a central portion from which at least one arm is in fluid communication.

In another aspect, the plurality of air flow channels may comprise a first arm and a second arm recessed into the main support portion, wherein the arms may define an obtuse angle between them.

In another aspect, the plurality of air flow channels comprise four arms that are symmetrical about a centerline of the panel.

In another aspect, a fluid permeable cushioning material may be located over the panel, wherein the seat cover may be located over the cushioning material, wherein the seat cover may have selected gas permeable areas over the air flow channels and other areas of non-permeability.

In another aspect, a seat may have a seat base panel and a seat back panel. Each panel may have at least one seat cover groove recessed within the respective panel. The seat cover grooves may each have at least one tooth adapted to selectively retain a seat cover in the groove. Each panel may have a plurality of air flow channels recessed within the respective panels.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
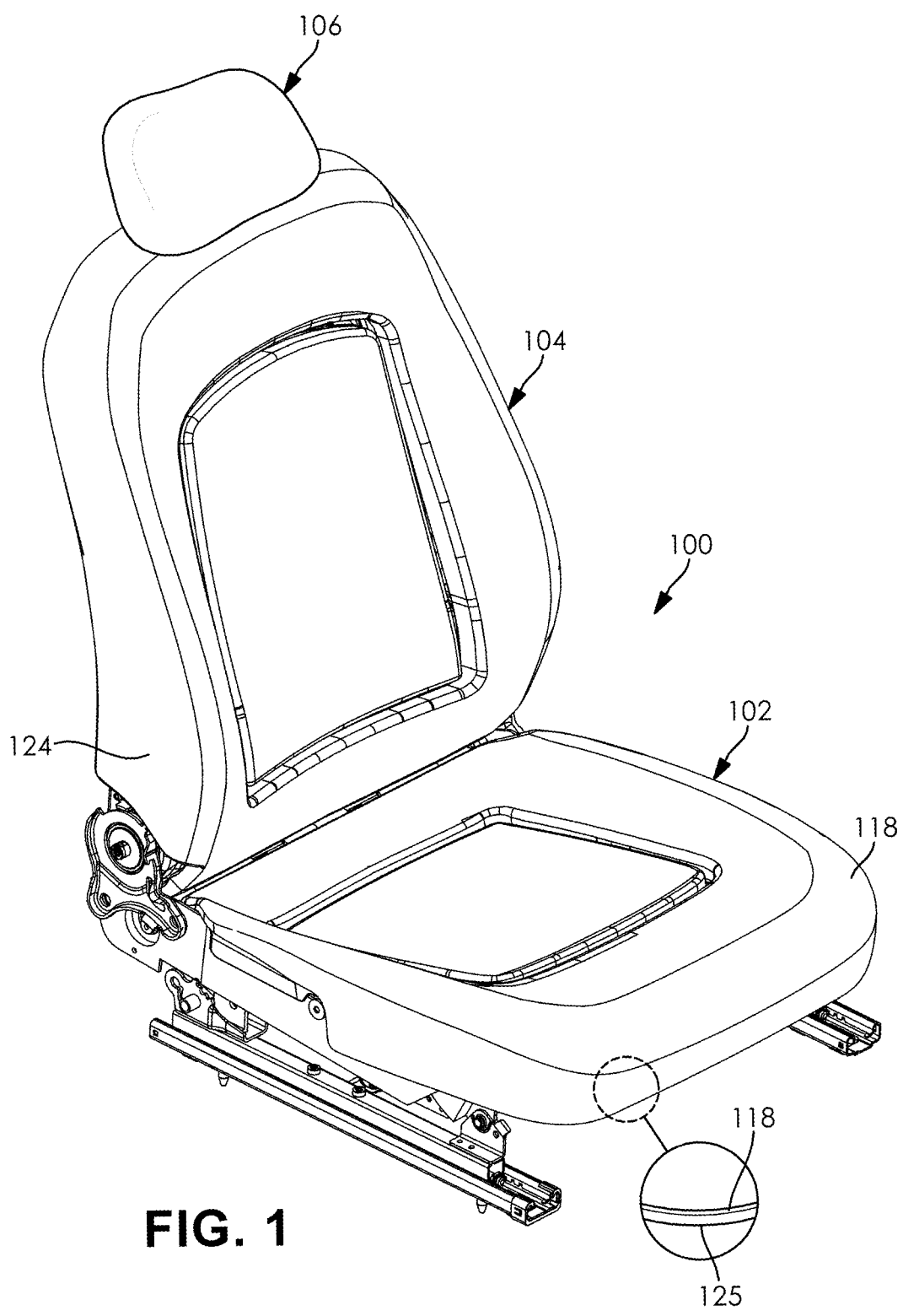
FIG. 1 is a left side front perspective view of a seat assembly according to an embodiment of the presently described subject matter, wherein the seat assembly includes a seat base assembly, a seat back assembly, and a headrest assembly.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 shows a seat assembly 100 for a motor vehicle (not depicted) according to an embodiment of the presently disclosed subject matter. The seat assembly 100 may include a seat base assembly 102, a seat back assembly 104, and a headrest assembly 106. The seat back assembly 104 may be coupled to the seat base assembly 102 and the headrest assembly 106. In certain embodiments, the seat base assembly 102 may be movable relative to a floorboard of the vehicle, the seat back assembly 104 may be movable relative to the seat base assembly 102, and the headrest assembly 106 may be movable relative to the seat back assembly 104. The seat base assembly 102 may be configured to support a buttock portion and leg portion of an occupant (not depicted). The seat back assembly 104 may be configured to support a back region of the occupant.

Figure 3:
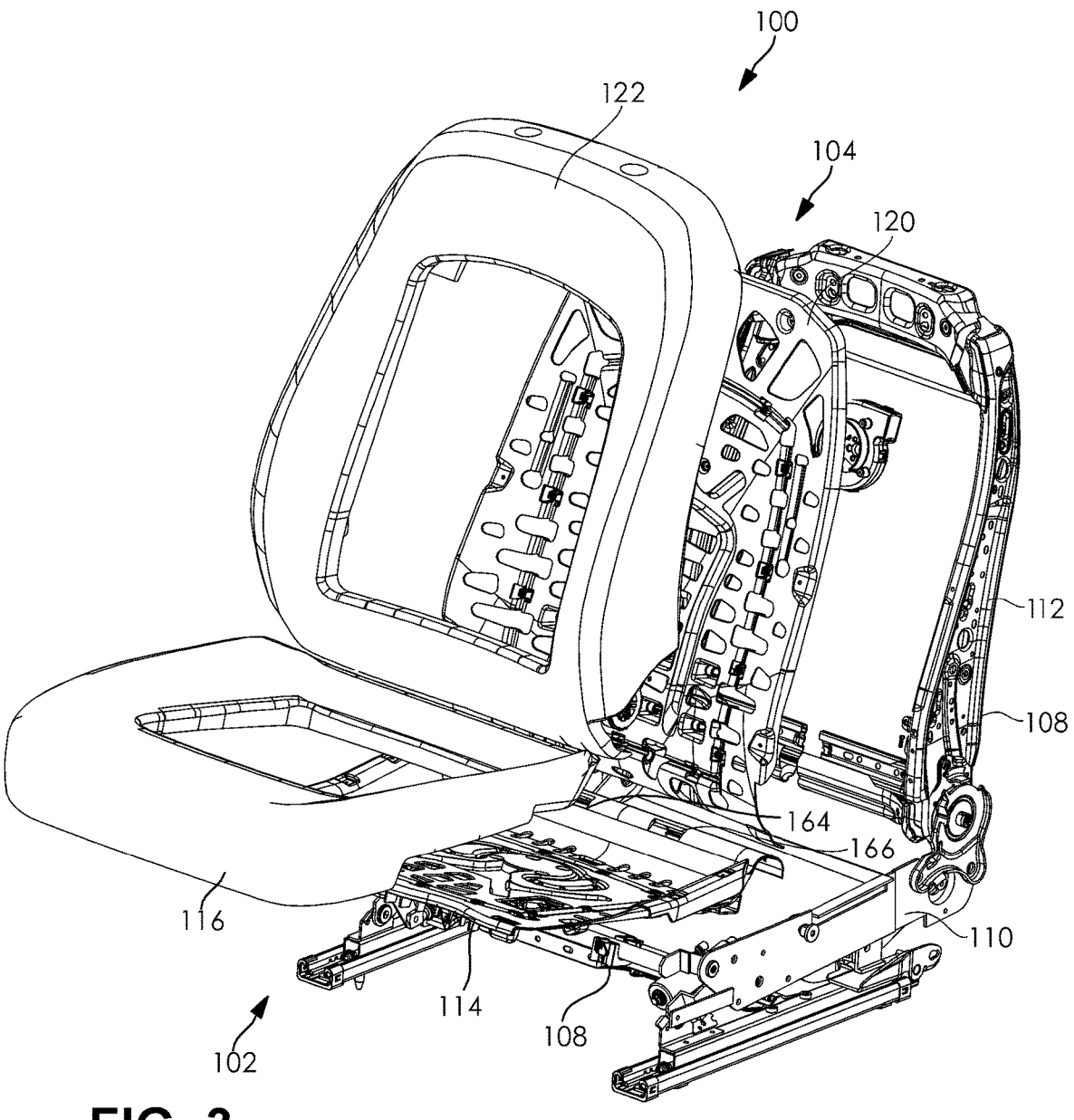
FIG. 3 is a right side front perspective view of the seat assembly of FIG. 1 in an exploded format.
Figure 4:
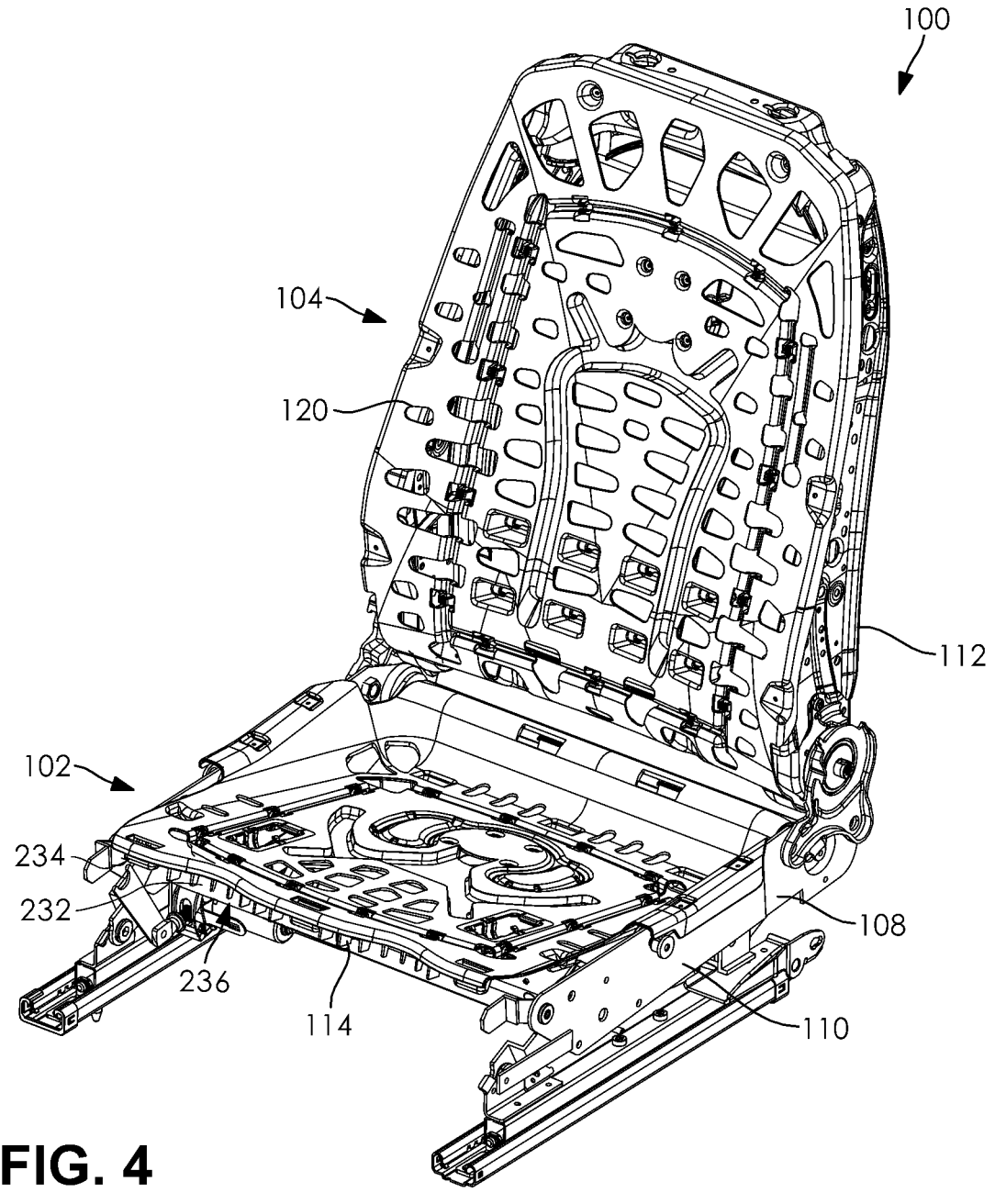
FIG. 4 is a right side front perspective view of the seat base assembly and seat back assembly.

As more clearly shown in FIGS. 3 and 4, the seat assembly 100 may include a seat frame 108 comprising a seat base frame portion 110, and a seat back frame portion 112. It is understood that the frame portions 110, 112 may be coupled together using any suitable means as desired. It is further understood that any suitable material may be employed to produce the frame portions 110, 112 as desired. For example, each of the frame portions 110, 112 may be formed from a rigid metal material.

In certain embodiments, the seat base assembly 102 may include a seat base panel 114 coupled to the seat base frame portion 110, a cushioning member 116 disposed on the seat base panel 114, and a seat cover 118 disposed over the cushioning member 116.

Similarly, the seat back assembly 104 may include a seat back panel 120 coupled to the seat back frame portion 110, a cushioning member 122 disposed on the seat back panel 120, and a seat cover 124 disposed over the cushioning member 122.

Each of the seat covers 118, 124 may include at least one inner layer 125 disposed on an interior surface thereof. In certain embodiments, the inner layer 125 may be produced from a foam laminate having a thickness in a range of about 3.0 mm to about 10 mm. It is understood that the inner layer 125 may be produced from any suitable material having any suitable thickness, as desired. In some embodiments, the seat covers 118, 124 and/or their inner layers 125 may be used without the cushioning materials 116, 122.

Figure 2:
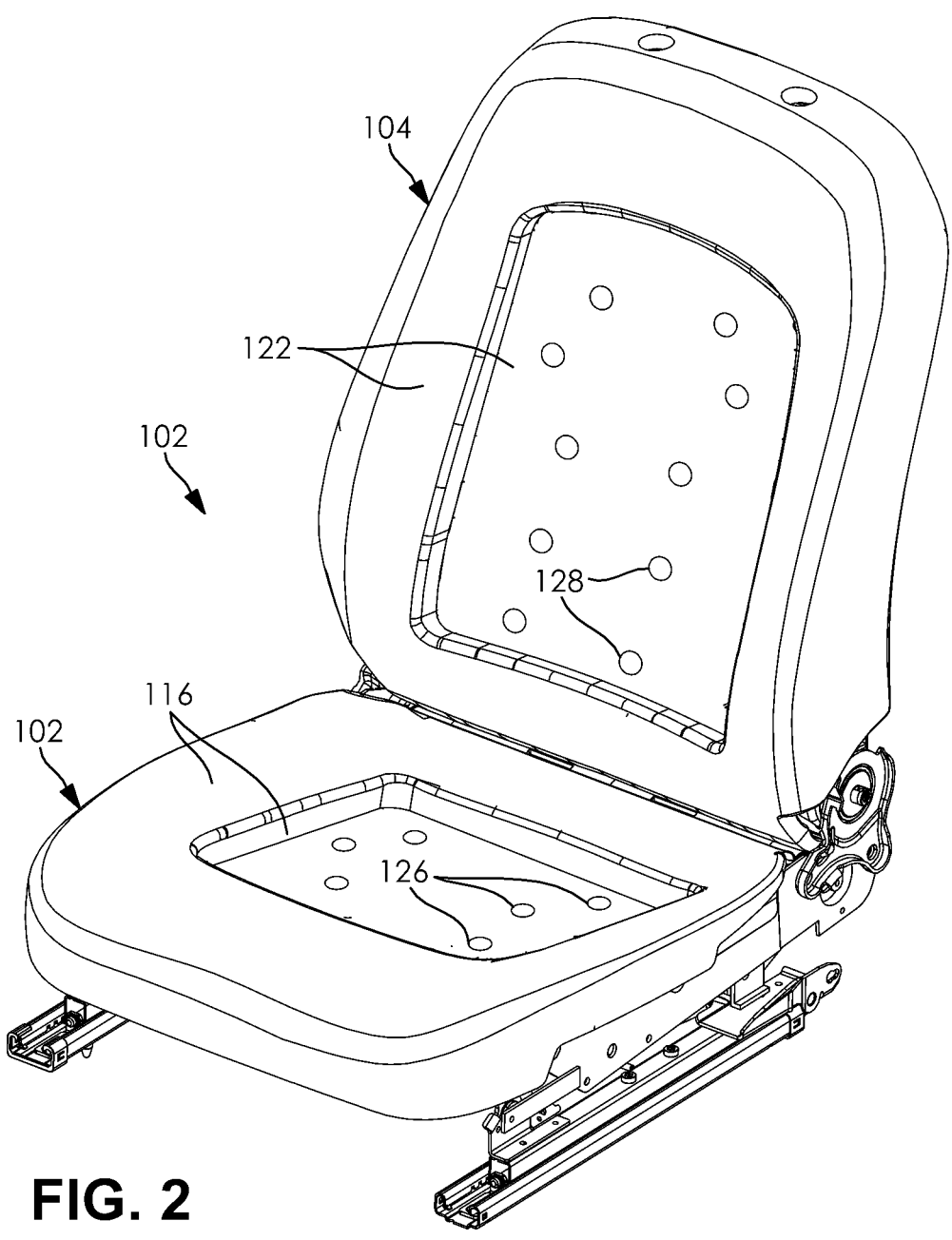
FIG. 2 is a right side front perspective view of the seat assembly of FIG. 1 depicting an additional feature of the assembly.

In one embodiment, each of the cushioning members 116, 122 include respective voids 126, 128 formed therein. As shown more clearly in FIG. 2, the voids 126, 128 of the cushioning members 116, 122, respectively, may be shaped and sized to receive respective thermal control members therein. The cushioning members 126, 128 may be produced from any suitable material as desired such as a polymer material, for example. Preferably, each of the cushioning members 126, 128 may be produced from a polyurethane material. In certain embodiments, the thermal control members may be heating and/or cooling pads to provide heat and/or cooling to the occupant of the seat assembly 1. The thermal control members may be in communication with a controller (not depicted) and a power source (not depicted).

Figure 5:
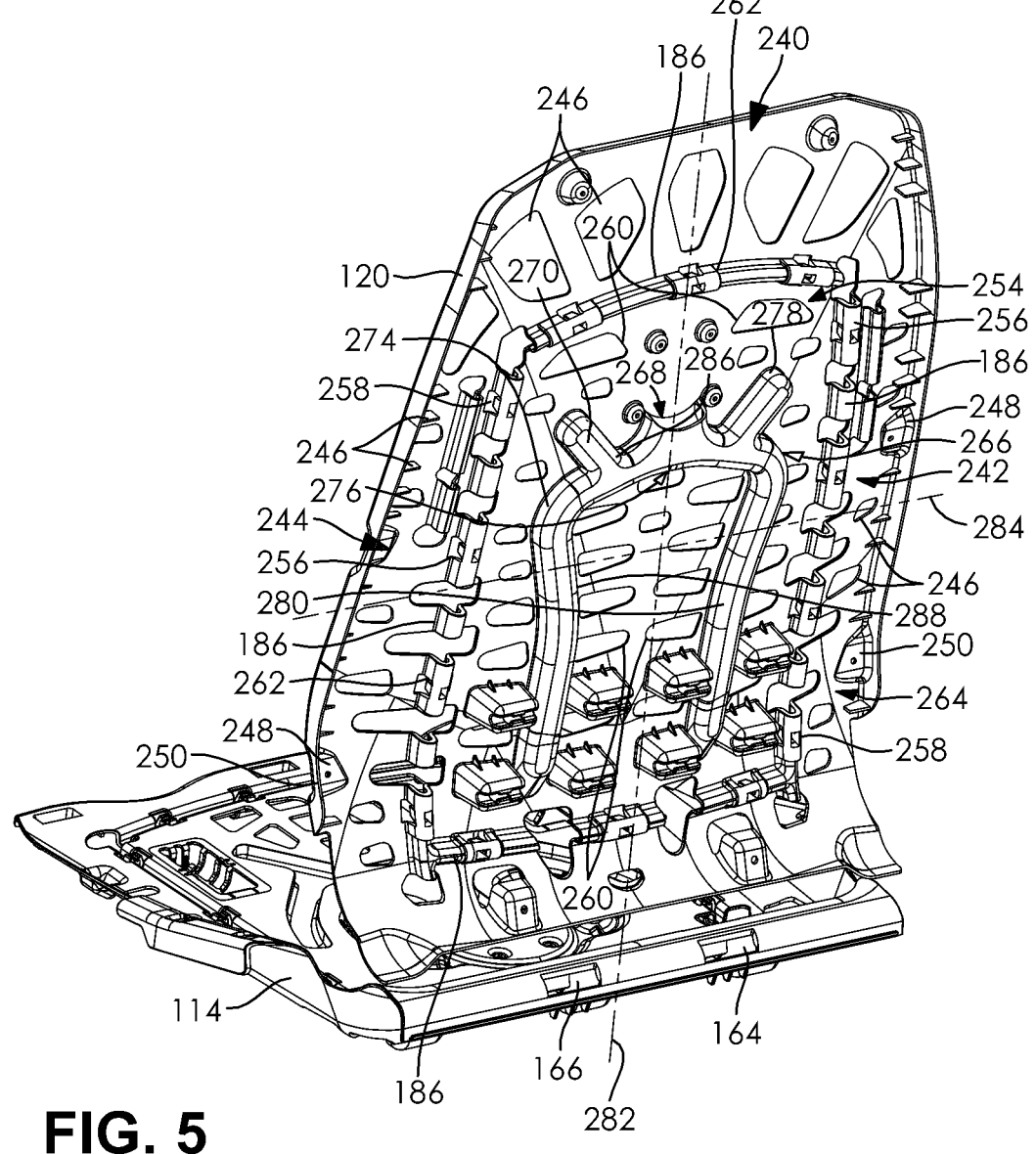
FIG. 5 is a rear perspective view of components of the seat base assembly and seat back assembly

Referring now to FIGS. 3, 4 and 5, the seat base panel 114 and the seat back panel 120 are shown. As illustrated, the seat base panel 114 and the seat back pane 120, respectively, may be a one-piece, unitary and integrally formed structure.

Both the seat base panel 114 and the seat back panel 120 may be formed of an elastomeric material. More preferably, the panels 114, 120 may be formed of a thermoplastic elastomer (TPE) material. Various types of the TPE material may be employed such as at least one of a styrenic block copolymer, thermoplastic olefinic elastomer, thermoplastic vulcanisate, thermoplastic polyurethane elastomer, melt processable rubber, thermoplastic polyester elastomer, and thermoplastic amide elastomer, for example.

In certain embodiments, the panels 114, 120 provide conforming support that flexes with the occupant's features and posture, and accommodates differently sized occupants with less need for active adjustments to the seat assembly 100. In certain embodiments, the panels 114, 120 may have a flexural modulus in a range of about 200 MPa to about 800 MPa, preferably about 290 MPa, and a tensile modulus in a range of about 10 MPa to about 300 MPa, preferably about 280 MPa. It is understood that the panels 114, 120 may be formed by any suitable method as desired such as an injection molding process, a thermoforming process, a compression molding process, a blow molding process, a vacuum casting process, a three-dimensional printing process, and the like, for example.

The panels 114, 120 formed from the TPE material may exhibit both thermoplastic and elastomeric properties which permit flexibility of the panels 114, 120 while militating against a permanent set thereof. As such, the panels 114, 120 have an ability to stretch to moderate elongations and return to an original shape. The panels 114, 120 may be relatively thin as compared to commonly known seat base structures. In certain embodiments, a thickness of the panels 114, 120 is in a range of about 1 mm to about 5 mm, preferably in a range of about 1.5 mm to about 3.0 mm, and more preferably about 2 mm or less. The thickness may be from an upper surface to a lower surface of the panels 114, 120; it does not include features of the panels Additionally, panels 114, 120, because of their flexibility and cushioning effect and features, may also permit the cushioning members 116, 122 to also be relatively thin as compared to commonly known cushioning members. In certain embodiments, a thickness of the cushioning members 116, 122 is in a range of about 15 mm to about 25 mm, preferably 20 mm or less. In other embodiments, the panels 114, 120 formed from the TPE material may eliminate a need for the cushioning materials 116, 112 in the seat base assembly 102.

As a non-limiting example, a thickness of the seat base assembly 102 and/or seat back assemblies 104 is about 45 mm less than commonly known seat base/back assemblies thanks to the thin nature of the panels 114, 120. Accordingly, in certain embodiments, the panels 114, 120 result in a reduction in mass and size of the seat base assembly 102 and seat back assembly 104 as compared to commonly known assemblies. Such reduction in the mass and size the assemblies 102, 104 improves manufacturability and decreases costs, while maintaining comfortability. Furthermore, the seat base assembly 102 and the seat back assembly 104 minimizes a consumption of valuable space within a passenger compartment of the vehicle. As a result, a size of the passenger compartment of the vehicle, and therefore, a size of the vehicle in its entirety, may be reduced, which also results in a reduction in mass and energy consumption of the vehicle.

Figure 6:
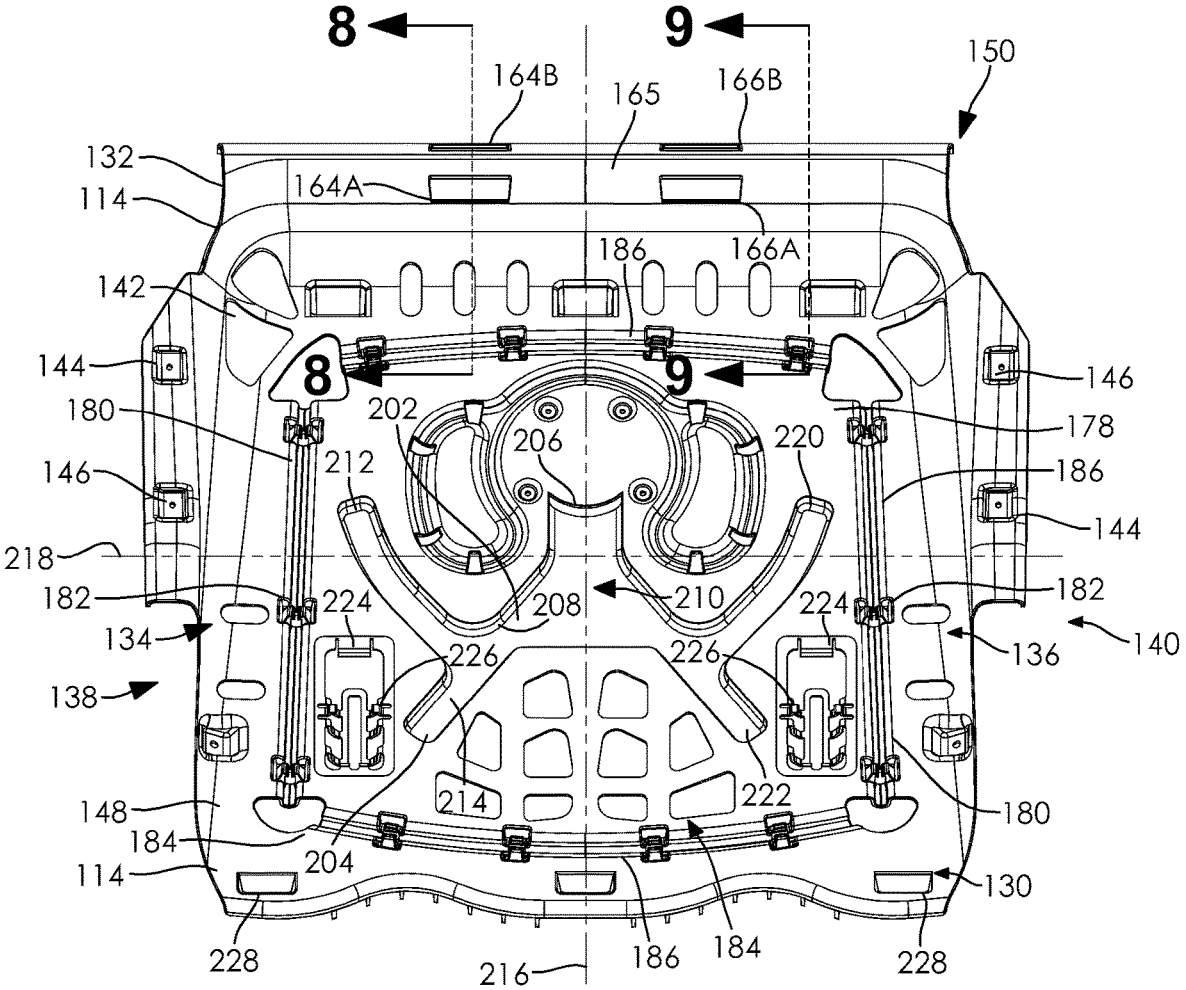
FIG. 6 is a top view of a component of the seat base assembly.
Figure 7:
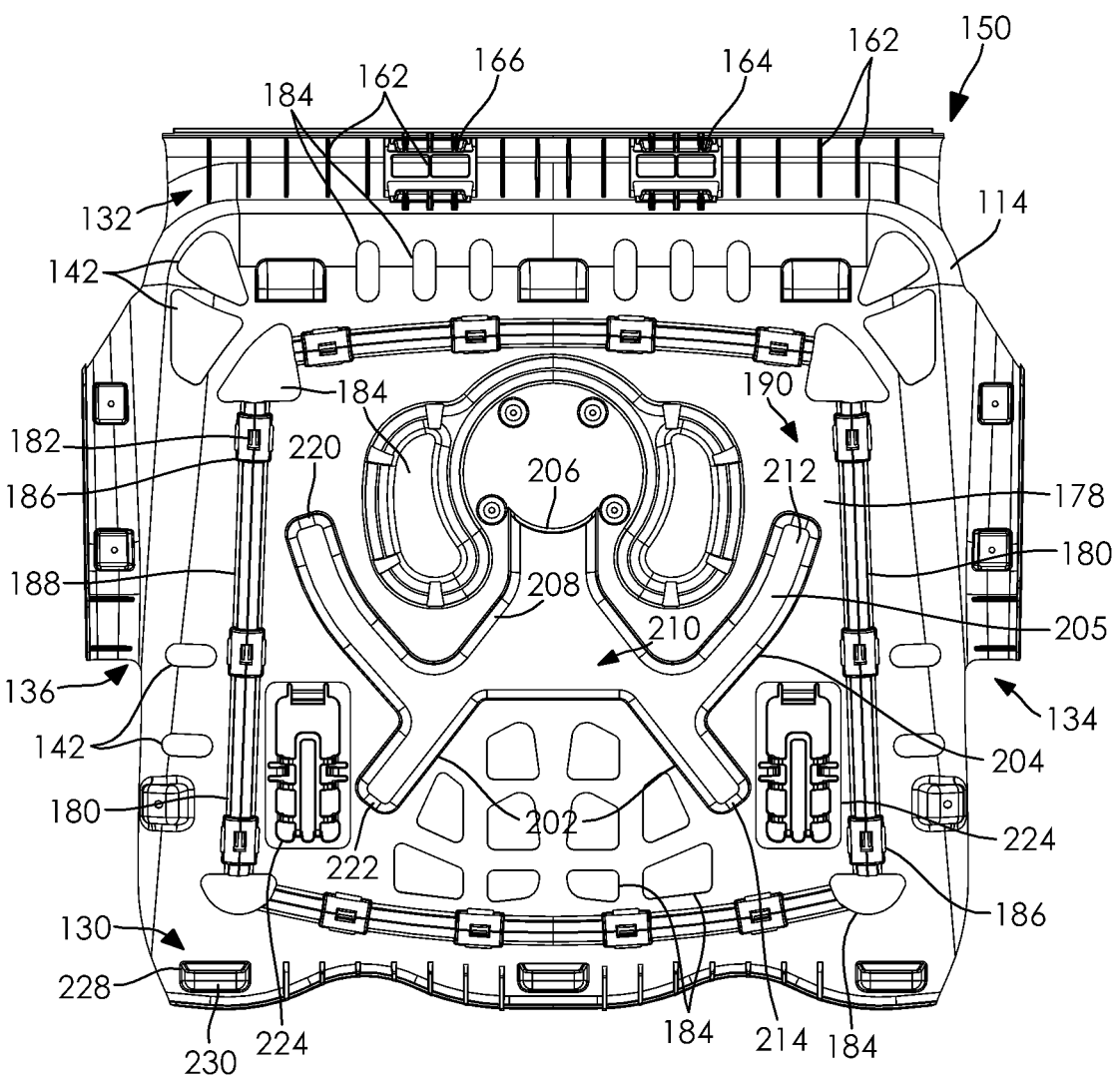
FIG. 7 is a bottom view of the component of FIG. 5.

As may be seen in FIGS. 6 and 7, the seat base panel 114 may include a front bolster 130, a rear bolster 132, a first side bolster 134 and a second side bolster 136. The first side bolster 130 is located on a first side 138 of the seat base panel 114 and the second side bolster 136 is located on a second side 140 of the seat base panel 114. Each of the first side bolster 138 and the second side bolster 140 may include openings 142 and/or attachment features (not depicted) formed therein. The side bolsters 124, 136 may extend for all or part of the respective sides 138, 140.

The openings 142 reduce mass and rigidity of the seat base panel 114. The openings 142 also permit portions of the seat base panel 114 to move with respect to one another when a load, such as provided by an occupant, is applied to the panel 114. The movement may be such as a deflection wherein portions with or adjacent the openings 142 may deflect more and/or more quickly than portions without the openings 142 to create a cushioning effect in the panel 114.

The openings 142 and/or attachment features may be configured to facilitate attachment of the seat base panel 114 to the seat base frame portion 108. A size, shape, and configuration of the openings 142 may be any as desired. By modifying the size, shape and/or configuration of the openings 142, the amount of deflection and speed of the deflection of the panel 114 may be selected. More or less openings 142 and attachment features than shown may be employed to facilitate attachment of the seat base panel 114 to the seat base frame portion 108.

In one embodiment, the seat base panel 114 may further include at least one boss 144 formed therein. The boss 144 may be configured to receive a mechanical fastener (not depicted) employed to attach the seat base panel 114 to the seat base frame portion 110. At least one of the bosses 144 may be located in a recess cavity 146 formed in the seat base panel 114. The recess cavity 146 may function to locate the boss 144 below an upper surface 148 of the panel 114.

As shown in FIG. 6, the seat base panel 114 may have a frame connection member 150. The frame connection member 150 may be located at or adjacent the rear bolster 132. In some cases, the frame connection member 150 may be formed with the rear bolster 132. The frame connection member 150 may have at least a partial complementary shape to an adjacent portion of the seat frame 108. In some embodiments, the seat frame 108 adjacent the rear bolster 132 may be such as a tube or a bar. It may be preferable that at least a portion of the frame connection member 150 has a complementary shape to the tube or bar.

Figure 8:
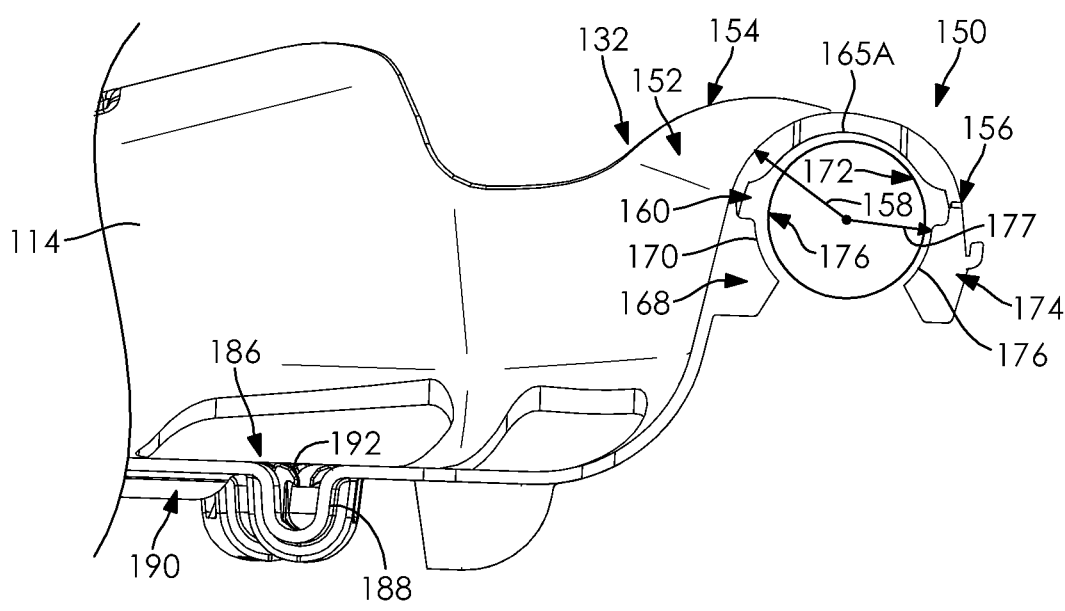
FIG. 8 is a sectional view taken along line 8-8 of FIG. 6.
Figure 9:
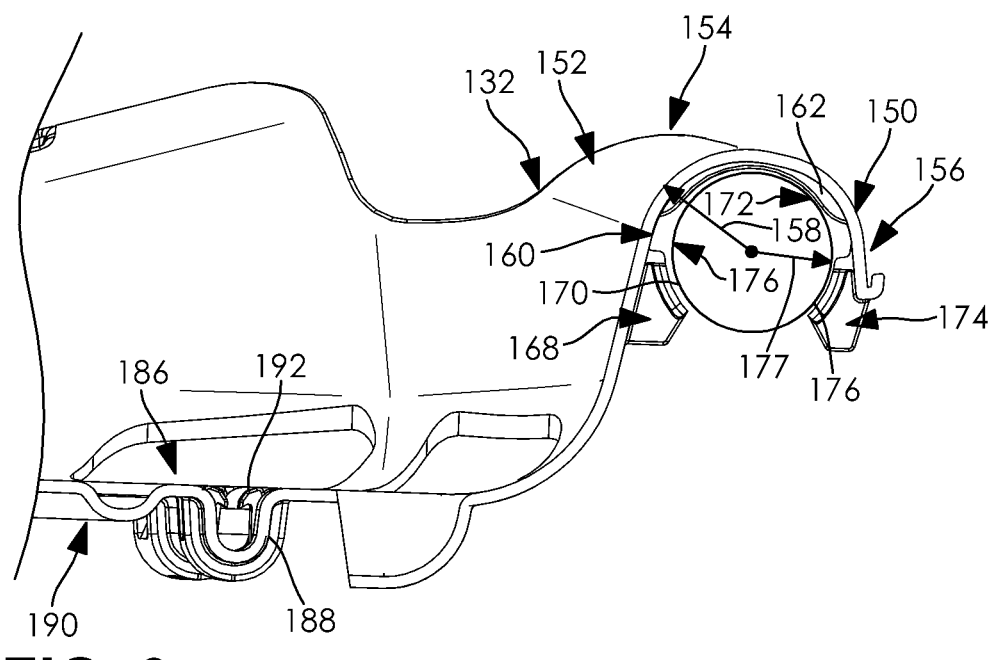
FIG. 9 is a sectional view taken along line 9-9 of FIG. 6.

In an example, at least a portion of the frame connection member 150 may have a generally circular cross-section. In such a case, at least one area of the rear bolster 132 may have at least a partial circular cross-section, which may be seen in FIGS. 8 and 9. In these areas, the rear bolster 132 may be constructed of a leading wall 152, a connecting wall 154 and a trailing wall 156. One or more of these walls may be used to position the cushioning member 116 on the panel 114 and to assist maintaining the member 116 from moving about on the panel 114.

The leading wall 152 may extend at least partially about the frame connection member 150 at a substantially constant distance in a curvilinear fashion at a first radius 158 measured from a center portion of the frame connection member 150. A gap 160 may exist between the leading wall 152 and the frame connection member 150.

The leading wall 152 may transition in a curvilinear fashion to the connecting wall 154. The connecting wall 154 may also extend at least partially about the frame connection member 150 at the same radial distance as the leading wall 152.

In some embodiments, an inwardly extending member 162 may extend from one or more of the leading wall 152, the connecting wall 154 and/or the trailing wall 156 inwardly toward the frame connection member 150. The inwardly extending member 162 may be such as a tab or rib than extends tangent the walls 152, 154, and/or 156. The inwardly extending member 162 may provide reinforcement and stiffness to the frame connection member 150.

The connecting wall 154 transitions to the trailing wall 156. The trailing wall 156 may extend about the frame connection member 150 at a substantially constant distance in a curvilinear fashion at the first radius 158. The gap 160 may extend between the frame connection member 150 and the trailing wall 156.

In some embodiments, the rear bolster 132 may have a different cross-sectional shape and/or features than as noted above. For example, in certain areas of the rear bolster 132 first and second apertures 164, 166 may be provided, as show in FIGS. 6 and 7. The apertures 164, 166 may each comprise a respective pair of apertures 164A, 164B, 166A, 166B.

The apertures 164A, 164B, 166A, 166B may be of any shape or size but in some cases they may be generally rectangularly shaped. The apertures 164A, 164B, 166A, 166B may also be generally the same size and shape as one another. The apertures 164A, 164B, 166A, 166B may provide a degree of flexibility to the rear bolster 132.

The leading wall 152 may define a portion of the perimeter of the first aperture 164. In that area, an inner surface 168 of the leading wall 152 may have a first clamp portion 168. The first clamp portion 168 may extend radially inwardly toward the frame connection member 150. The first clamp portion 168 may have an inner surface 170 that may have a complementary shape to the frame connection member 150. For example, in the case where the frame connection member 150 has a round cross-section, the inner surface 170 may be concave to at least partially receive the frame connection member 150.

A gap 172 may separate the first clamp portion 168 from one of the inwardly extending members 162. A gap 172 may also be provided between the inwardly extending members 162 and a second clamp portion 176.

The second clamp portion 176 may extend radially inwardly toward the frame connection member 150 from the trailing wall 156. The second clamp portion 176 may have an inner surface 176 that may have a complementary shape to the first clamp portion 150. In the case where the frame connection member 150 has a round cross-section, the inner surface 176 may be concave to at least partially receive the frame connection member 150.

The inner surfaces 170, 176 of the clamp portions 168, 176 may define a second radius 177 that is different than the first radius 158.

The second radius 177 may be smaller than the first radius 158 and/or a different shape may be employed. The second radius 177 may be the same or similar to the profile of the frame connection member 152. Further, the inner surfaces 170, 176 may be adapted for selective contact with the frame connection member 150.

In some cases, a rib 165 may extend between each of the aperture in a pair 164A, 164B, 166A, 166B. Thus, in some cases, the aperture 164A, 166A may be defined between the leading wall 152 and the rib 165. An inner surface 165A of the rib 165 may have a complementary shape to the frame connection member 150 and the inner surface 165A may be all or part of an inwardly extending member 162. In such cases, the inner surface 165A may be curved. The inner surface 165A of the rib 165 may be adapted to be at least in selective contact with the frame connection member 150.

The rib 165 and the trailing wall 156 may define the second aperture 164B, 166B. The trailing wall 156 may extend at least partially along the first radius 158.

The leading wall 152, the connecting wall 154 and the trailing wall 156 may be adapted to initially flex outwardly to accommodate the frame connection member 150. When the frame connection member 150 is captured within clamp portions 168, 176, the leading wall 152, the trailing wall 156 and the connecting wall 154 may flex inwardly into at least partial direct contact, which contact may be through the clamp portions 168, 176 and/or the rib 165, with the frame connection member 150. This captures the frame connection member 150 therein and securely but selectively locks the panel 114 to the member 150.

The seat base panel 114 further includes a main support portion 178 formed between the front and rear bolsters 130, 132 and between the first and second side bolsters 134, 136. The main support portion 178 may be provided in a central section of the seat base panel 114.

The main support portion 178 may be connected to the first side bolster 134, the second side bolster 136, the front bolster 130 and the rear bolster 132 by a plurality of connecting portions 180. Apertures 182 may be located on the sides of some, if not all, of the connecting portions 180. The apertures 184 weaken the area between the main support portion 178 and the bolsters 130, 132, 134, 136 to impart a degree of flexibility to the connecting portions 180. Thus, the connecting portions 180 permit the main support portion 178 to move relative to the bolsters 130, 132, 134, 136 when a load is applied to the seat base panel 114 by an occupant. In certain embodiments, the main support portion 178 may deflect more quickly than the bolsters 130, 132, 134, 136 when the load is applied to the seat base panel 114 by the occupant by virtue of the connecting portions 180. The front and rear bolsters 130, 132 and the first and second side bolsters 134, 136 may deflect at a different rate than a rate of deflection of the main support portion 178 when the load is applied to the seat base panel 114 by the occupant. It may be that appreciated that a greater or fewer number of connecting portions 180 may be used, and/or that the thickness of the connecting portions 180 may be varied to adjust the deflection rate to a desired amount.

The main support portion 178 may have other apertures 184 in selected portions to function in the same or similar manner as described above. These apertures 184 demonstrate different sizes and shapes that may be used to effect deflection performance at different areas of the seat base panel 114.

The seat base panel 114 may have retention features 186, as shown in FIGS. 6, 7 8 and 9. The retention features 186 may be unitary, one piece and integrally formed with the panel 114. The retention features 186 may be located anywhere on the seat base panel 114. In some embodiments, the retention features 186 may be part of some or all of the connecting portions 180, or the retention features 186 may be separate from the connecting portions 180.

As shown in the depicted embodiment, the retention features 186 may be part of the connecting portions 180, and together they may form a groove or trough-like structure in the panel 114. While a groove is mentioned, it may be possible for the retention feature 185 to be groove-less. In such a case, the retention feature 185 may be comprised of just the teeth described below. In other cases, other retention features may be employed.

While the retention features 186 may be part of the connecting portions 180 186, the two may be separately located from one another. Thus, for example, the retention feature 186 might be located in the main support portion 176 and/or in one of the bolsters 130, 132, 134, 136. In such cases, the retention feature 186 may have the characteristics as described above.

By way of one example, an area of a bolster 130, 132, 134, 136 adjacent a connecting portion 186 may be generally co-planar with an area of the main support portion 178 opposite the bolster area. However, the retention feature 186 may be such as a groove 188, the bottom of which is not coplanar with either the bolster area or the main support portion 178 area. Thus, the bottom of the groove 188 may be located below a lower surface 190 of the panel 114.

In one embodiment, the groove 188 may extend substantially continuously with a substantially constant cross-section about the main support portion 178. The cross-sectional shape may be such as U-shaped. In this instance, substantially continuously may include the situation where the groove 188 is interrupted by the apertures 178. The groove 188 may extend substantially continuously along the front bolster 130, the rear bolster 132, the first side bolster 134 and the second side bolster 136. It may also be permissible for the groove 188 to only extend in segments along selected portions of the panel 114.

Figure 10:
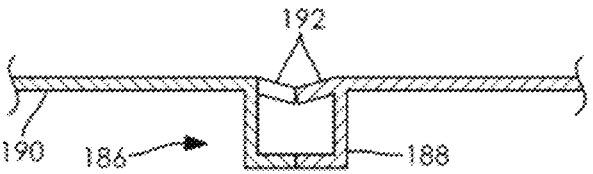
FIG. 10 is a sectional view taken along a feature of FIG. 6.

In one embodiment, the retention feature 186 may be comprised of one or more teeth 192. The teeth 192 may be one-piece, unitary and integrally formed with the panel 114. It may be that the teeth 192 are arranged in pairs along the groove 188. In some cases, some or all of the teeth 192 may be located at the top of the groove 188 so that they are generally coplanar with the adjacent area of the bolster 130, 132, 134, 135 or adjacent the area of the main support portion 178 as shown in FIG. 10. In other cases, some or all of the teeth 192 may be recessed into the groove 188. The teeth 192 may be located in aligned pairs with one another, in offset pairs, or individual teeth 192 may be located along the groove 188 where they are not aligned with other teeth 192. The teeth 192 may or may not be aligned across from one another and/or vertically aligned with one another within the groove 188.

Figure 11:
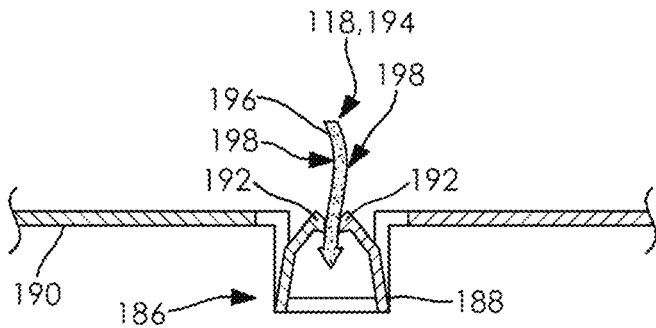
FIG. 11 is a sectional view showing another embodiment of the feature from FIG. 6.

In another embodiment, the teeth 192 may extend from the bottom of the groove 188, as shown in FIG. 11. The extension from the bottom of the groove 188 may be such as transverse so that the teeth 192 may be generally parallel the side walls of the groove 188. Or, in other cases, the teeth 192 may be located at angles other than transverse with respect to the bottom of the groove 188 and parallel the side walls.

Figure 12:
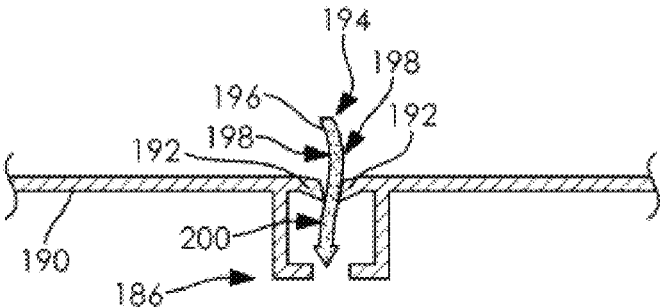
FIG. 12 is a sectional view showing another embodiment of the feature from FIG. 6.

In some embodiments, the teeth 192 may not only extend at least partially across the groove 188, but they may also extend downwardly into the groove 188. In such a case, the teeth 192 may be formed into a hook-like shape. It may be that the teeth 192 are aligned with the apertures 182 such that the teeth 192 are above the apertures 182 in the groove 188 and the connection portions 180 are located between the teeth 182 and the apertures 182, as shown in FIG. 12.

The teeth 182, being formed of the same material as the panel 114, may have a degree of flexibility to them. The teeth 182 may be adapted to permit a portion of the seat cover 118 to be pushed into and/or beyond the teeth 182 so that the seat cover 118 is located at least selectively in the groove 188, as shown in FIG. 12

In some embodiments, the seat cover 118 may be urged into the groove 188 and the teeth 192, and perhaps further secured thereto with one or more attachment members 194. The attachment members 194 may take different forms as well as sizes and shapes. Further, the different attachment members 194 may be used to secure the seat cover 118 to the panel 130.

By way of one example, the attachment member 194 may be such as a dart 196. The dart 196 may have a body portion 198 connected to a head portion 200. The dart may be located at a seam of the seat cover 118, or in an area where the seat cover 118 should be secured to the panel 130.

The head portion 200, which may be a discrete individual dot or point, or which may be a strip of material, or a series of strips of material, may be urged into the groove 188 and beyond one or more of the teeth 182. The teeth 182 make removal of the dart 196 difficult as the teeth 182 function to reduce the width of the groove 188 and the teeth 182 may also contact the head portion 200 to selectively block its removal. The body portion 198 of the dart 196 may be such as strip of material or a series of strips of material connected to the head portion 200. The body portion 198 may be such as a strip of fabric that can be manipulated between and/or among the teeth 182. The body portion 198 may be connected to the seat cover 118 such as by sewing, adhesives, welding or the like.

In some embodiments, the main support portion 178 of the seat base panel 114 may have one or more air flow channels 202. The air flow channels 202 may be unitary, one-piece and integrally formed with the seat base panel 114 in whole or in part.

The air flow channels 202 may be defined in part by a recessed portion 204 of the panel 114, as shown in FIGS. 6 and 7. The air flow channels 202 may have different sizes and shapes than as depicted and described herein.

The recessed portion 204 of the panel 114 may have a lower surface 205 that may be generally coplanar with the bottom of the groove 188. Thus, the lower surface 205 of the recessed portion 204 may not be coplanar with the upper surface 148 of the panel 114.

In one embodiment, the air flow channels 202 may be connected to an air flow opening 206 in the panel 114. The air flow opening 206 may extend from the upper surface 148 to the lower surface 190 of the panel 114. The air flow opening 204 206 may be generally located approximately equal distance between the side bolsters 134, 136. The air flow opening 206 may be positioned nearer the rear bolster 132 than the front bolster 130, but variations are permissible.

The recessed nature of recessed portion 204 in the seat base panel 114 creates walls 208 in the seat base panel 114 that at least partially define the air flow channels 202. The walls 208 may extend generally transverse the upper surface 148 of the panel 114 and/or the lower surfaces 205 of the recessed portion, but other angles may be used. The air flow channels 202 may thus be at least partially defined by the walls 208 and the lower surface 205.

In one embodiment, the air flow channels 202 may be comprised of a central portion 210. The central portion 210 may be in fluid communication with the air flow opening 206. The central portion 210 may be such as generally round, oval or it may have a polygonal shape.

In some embodiments, at least one arm may extend from the central portion 210, such as in a fluidly connected manner. Each arm may be part of the air flow channels 202. It may be preferred to have a plurality of arms, each fluidly connected to the central portion 210. The arms may extend from the central portion 210 with different lengths, widths, shapes and/or in different directions.

In one example, a first arm 212 may extend from the central portion 210 in an outward, curvilinear direction toward the intersection the first side bolster 134 and the rear bolster 132. The first arm 212 may terminate before it reaches the intersection or a retention feature 186. In some cases, the first arm 212 may have curved from the central portion 210 so that its terminus is approximately parallel with the air flow opening 206.

Some embodiments may also have a second arm 214 that may extend from the central portion 210 in an outward, generally linear direction toward the intersection of the first side bolster 134 and the front bolster 134. The second arm 214 may terminate before it reaches the intersection or a retention feature 186. In the current example, the first and second arms 212, 214 may generally define an obtuse angle between them.

The seat base panel 114 may be at least substantially symmetrical about a centerline 216. The centerline 216 extends from the front bolster 130 to the rear bolster 132. By substantially symmetrical it may be that the panel 114 has substantially the same features and feature shapes on either side of the centerline 216. However, it may be that the panel 114 has variations between the two sides such as fastener openings or apertures 182, 184, or the air flow channels 202. Further, it may be possible that additional air flow channels 202 beyond those described may be used. Further yet, such additional air flow channels 202 may be such as capillaries that extend from the channels 202 in different sizes and shapes to reach tighter areas in the panel 114.

The seat base panel 114 may also have a lateral line 218. The lateral line 218 may extend transverse the center line 216. The lateral line 218 may extend from the first side bolster 134 to the second side bolster 136. In some embodiments, the seat base panel 114 is not symmetrical about the lateral line 218.

In the instance where the seat base panel 114 is substantially symmetrical about the centerline 216, the panel 114 may have a third arm 220 that may be substantially a mirror image of the first arm 212. Thus, the third arm 220 may extend from the central portion 210 in an outward, curvilinear direction toward the intersection of the second side bolster 136 and the rear bolster 132. The third arm 220 may terminate before it reaches the intersection or a retention feature 186. In some cases, the third arm 220 may have curved from the central portion 210 so that its terminus is approximately parallel with the air flow opening 206.

It may be also that the panel 114 may have a fourth arm 222 that may be substantially a mirror image of the second arm 214. Thus, the fourth arm 222 may extend from the central portion 210 in an outward, generally linear direction toward the intersection of the second side bolster 140 and the front bolster 134. The fourth arm 222 may terminate before it reaches the intersection or a retention feature 186. In the current example, the third and fourth arms 220, 222 may generally define an obtuse angle between them.

In some embodiments, the second and fourth arms 214, 222 may define an obtuse angle between them. It may be also that the area between the second and fourth arms 214, 222 may have at least one if not a plurality of apertures 184. The apertures 184 may assist in creating a degree of flexibility for the panel 114. The size, shape, location and number of apertures 184 may be varied to create a desired flexibility in the panel 114.

In some embodiments, the first and third arms 220, 222 may define an obtuse angle between them. The air flow opening 206 may be located between the first and third arms 220, 222.

In some embodiments, seat device supports 224 may be formed in the panel 130. The seat device supports 224 may be located adjacent the terminus of the second and fourth legs 220, 224. In one example, the seat device supports 224 may be located somewhat between the terminus of the second and fourth legs 220, 224 and the retention features 186.

The seat device supports 224 may be comprised of apertures in the panel 130. One or more ribs 226 may extend across the seat device supports 224. The ribs 226 may be curvilinear, such as U-shaped. In such a condition, the ribs may extend below the lower surface 190 of the panel 130. The ribs 226 maybe unitary, one-piece and integrally formed with the panel 130. The ribs 226 may be spaced apart from one another so that gaps are created between them. In some cases, the seat device supports 224 may have a generally rectangular shape and may generally extend parallel the centerline 216 of the panel 130.

The seat device supports 224 may be adapted to at least selectively receive haptic motors at least partially therein. The motors may be used to provide a sensation, such as a vibration, to the seat occupant upon the occurrence of vehicle events.

The panel 130 may also have one or more slots 228 in the front bolster 130. The slots 228 may be spaced outward from the retention features 186. The slots 228 may be generally rectangular in shape with their longer dimension being perpendicular to the centerline 216 of the panel 130.

The slots 228 may be adapted to selectively receive portions, such as tabs 230, from a seat pan 232 therein. The slots 228 receive the tabs 230 so as to connect the panel 130 to the seat pan 232.

The panel 130 may have a finger 234 associated with one or more of the slots 228 that may be used to support and/or selectively secure the panel 130 to the pan 232. In one example, the fingers 234, which may be one-piece, integrally formed and one-piece with the panel 130, may extend below the upper surface 148 of the panel 130. Each of the fingers 234 may be adapted to be selectively located under a lip 236 of the seat pan 232 so as to fix and retain the panel 130 with respect to the seat pan 232, as shown in FIG. 4.

In some embodiments, the cushioning member 116 may be located at least partially over the panel 130, such as at least partially over the upper surface 148 of the panel 130. The cushioning member 116 may extend in whole or in part across the bolsters 130, 132, 134, 136 and/or the main support portion 178 of the panel 130. The cushioning member 116 may be a single layer or it may be comprised of more than one layer. The cushioning member 116 may be such as a foam and/or woven material. It may be preferred that the cushioning member 116 is air permeable in whole or in part.

The seat cover 118 may extend over at least a portion of the upper surface 148 of the panel 114, and the cover 118 may also extend over at least a portion of the cushioning member 116 as well. The seat cover 118 may be secured to the panel 114 as noted above. In doing so, the seat cover 118 may function to direct air. By way of example, it may be that when the cover 118 is secured to the panel 114 as noted above, the cover 118 prevents air from flowing past the retention features 186. Thus, the air may be trapped between the panel 120, the retention features 186 and the cover 118.

Heated or cooled air may be provided by a blower or fan connected to the air flow opening 206. The blower or fan may be located below the panel 120.

In one embodiment, the air flows from the blower or fan, through the air flow opening 206 and into the air flow channel central portion 210. The air dissipates into the arms 212, 214, 220, 222 in equal or unequal amounts. The air may travel along the arms 212, 214, 220, 222 in whole or in part. As the air cannot escape through the arms 212, 214, 220, 222, and because it may be provided with a positive pressure, the air may move in an upward direction away from the panel 114.

In such a case, the air may move through the cushioning member 116 (if one is used) where it meets the cover 118. The cover 118 may be provided with air apertures in selected portions of the cover 118 through which the air may flow so that it exits at least adjacent the occupant in desired locations.

In other instances, the blower/fan may be reverse its direction so that it provides a negative pressure through the air apertures, the cushioning member 116 and the arms 212, 214, 220, 222. The air may be exhausted through the blower/fan beneath the seat assembly 100.

As may be seen in FIGS. 4 and 5, the seat back panel 120 may include a top bolster 240, a first side bolster 242 and a second side bolster 244. All of the bolsters 240, 242, 244 may include openings 246 and/or attachment features (not depicted) formed therein. The openings 242 function the same or similar way to openings 142 described above. The bolsters 240, 242, 244 may extend substantially about the panel 120.

In one embodiment, the seat back panel 120 may further include at least one boss 248 formed therein. The boss 248 may be configured to receive a mechanical fastener (not depicted) employed to attach the seat back panel 120 to the seat frame 108. At least one of the bosses 248 may be located in a recess cavity 250 formed in the seat back panel 120. The recess cavity 250 may function to locate the boss 248 below an upper surface 252 of the panel 120.

The seat back panel 120 further includes a main support portion 254 formed between the top bolster 240 and between the first and second side bolsters 242, 244. The main support portion 254 may be provided in a central section of the seat back panel 120.

The main support portion 254 may be connected to the first side bolster 242, the second side bolster 244 and the top bolster 240 by a plurality of connecting portions 256. Apertures 258 may be located on the sides of some, if not all, of the connecting portions 256. The apertures 258 weaken the area between the main support portion 254 and the bolsters 240, 242, 244 to impart a degree of flexibility to the connecting portions 256. Thus, the connecting portions 256 permit the main support portion 254 to move relative to the bolsters 240, 242, 244 when a load is applied to the seat back panel 120 by an occupant. In certain embodiments, the main support portion 254 may deflect more quickly than the bolsters 240, 242, 244 when the load is applied to the seat back panel 120 by the occupant by virtue of the connecting portions 256. The top bolster 240 and the first and second side bolsters 242, 244 may deflect at a different rate than a rate of deflection of the main support portion 254 when the load is applied to the seat back panel 120 by the occupant. It may be that appreciated that a greater or fewer number of connecting portions 256 may be used, and/or that the thickness of the connecting portions 256 may be varied to adjust the deflection rate to a desired amount.

The main support portion 254 may have other apertures 260 in selected portions to function in the same or similar manner as described above. These apertures 260 demonstrate different sizes and shapes that may be used to effect deflection performance at different areas of the seat back panel 120.

The seat back panel 120 may have retention features 186, which may be substantially the same as those described above for the seat base panel 114. The retention features 186 may be unitary, one piece and integrally formed with the panel 120. Further, the retention features 186 may be located anywhere on the seat back panel 120. In some embodiments, the retention features 186 may be part of some or all of the connecting portions 256, or the retention features 186 may be separate from the connecting portions 256.

As shown in the depicted embodiment, the retention features 186 may be part of the connecting portions 256, and together they may form a groove or trough-like structure in the panel 120.

Areas of the bolsters 240, 242, 244 adjacent a connecting portion 256 may be generally co-planar with an area of the main support portion 254 opposite the bolster area. However, the retention feature 186 may be such as a groove 262, the bottom of which is not coplanar with either the bolster area or the main support portion 254 area. Thus, the bottom of the groove 262 may be located below a lower surface 262 of the panel 120.

In one embodiment, the groove 262 may extend substantially continuously with a substantially constant cross-section about the main support portion 254. The cross-sectional shape may be such as U-shaped. In this instance, substantially continuously may include the situation where the groove 254 is interrupted by the apertures 258. The groove 262 may extend substantially continuously along the top bolster 240, the first side bolster 242 and the second side bolster 244. It may also be permissible for the groove 262 to only extend in segments along selected portions of the panel 120.

In one embodiment, the retention feature 186 may be comprised of one or more teeth 192 as described above. The teeth 192 may be one-piece, unitary and integrally formed with the panel 120. In some cases, some or all of the teeth 192 may be located at the top of the groove 262 so that they are generally coplanar with the adjacent area of the bolster 240, 242, 244 or adjacent the area of the main support portion 254 as shown in FIGS. 4 and 5. In other cases, some or all of the teeth 192 may be recessed into the groove 262.

The teeth 182, being formed of the same material as the panel 120, may have a degree of flexibility to them. The teeth 192 may be adapted to permit a portion of the seat cover 118 to be pushed into and/or beyond the teeth 182 so that the seat cover 118 is located at least selectively in the groove 188, as described above.

In some embodiments, the main support portion 254 of the seat back panel 120 may have one or more air flow channels 266. The air flow channels 266 may be unitary, one-piece and integrally formed with the seat back panel 120 in whole or in part.

The air flow channels 266 may be defined in part by a recessed portion 268 of the panel 120, as shown in FIGS. 4 and 5. The air flow channels 266 may have different sizes and shapes than as depicted and described herein.

The recessed portion 268 of the panel 120 may have a lower surface 270 that may be generally coplanar with the bottom of the groove 262. Thus, the lower surface 270 of the recessed portion 268 may not be coplanar with the upper surface 252 of the panel 120.

In one embodiment, the air flow channels 266 may be connected to an air flow opening 272 in the panel 120. The air flow opening 272 may extend from the upper surface 252 to the lower surface 264 of the panel 120. The air flow opening 272 may be generally located approximately equal distance between the side bolsters 242, 244.

The recessed nature of recessed portion 268 in the seat back panel 120 creates walls 274 in the seat base panel 120 that at least partially define the air flow channels 266. The walls 274 may extend generally transverse the upper surface 252 of the panel 120 and/or the lower surfaces 270 of the recessed portion 268, but other angles may be used. The air flow channels 266 may thus be at least partially defined by the walls 274 and the lower surface 264.

In one embodiment, the air flow channels 266 may be comprised of a central portion 276. The central portion 276 may be in fluid communication with the air flow opening 272. The central portion 276 may be such as generally round, oval or it may have a polygonal shape.

In some embodiments, at least one arm may extend from the central portion 276, such as in a fluidly connected manner. Each arm may be part of the air flow channels 266. It may be preferred to have a plurality of arms, each fluidly connected to the central portion 276. The arms may extend from the central portion 276 with different lengths, widths, shapes and/or in different directions.

In one example, a first arm 278 may extend from the central portion 276 in an outward direction toward the intersection the first side bolster 242 and the top bolster 240. The first arm 278 may terminate before it reaches the intersection or a retention feature 186. In some cases, the first arm 278 may have a terminus that is above the air flow opening 272.

Some embodiments may also have a second arm 280 that may extend from the central portion 276 in a downward generally linear direction. The second arm 280 may extend generally parallel the groove 262 extending along the first side bolster 242. In the current example, the first and second arms 278, 280 may generally define an obtuse angle between them.

The seat back panel 120 may be at least substantially symmetrical about a longitudinal centerline 282. By substantially symmetrical it may be that the panel 120 has substantially the same features and feature shapes on either side of the centerline 282. However, it may be that the panel 120 has variations between the two sides such as fastener openings or apertures 246, 258, 260, or the air flow channels 266.

The seat back panel 120 may also have a lateral line 284. The lateral line 284 may extend transverse the center line 282. The lateral line 284 may extend from the first side bolster 242 to the second side bolster 244. In some embodiments, the seat back panel 120 is not symmetrical about the lateral line 284.

In the instance where the seat back panel 120 is substantially symmetrical about the longitudinal centerline 282, the panel 120 may have a third arm 286 that may be substantially a mirror image of the first arm 278. Thus, the third arm 286 may extend from the central portion 276 in an outward direction toward the intersection of the second side bolster 244 and the top bolster 240. The third arm 286 may terminate before it reaches the intersection or a retention feature 186. In some cases, the third arm 286 may have a terminus is approximately parallel with the air flow opening 272.

It may be also that the panel 120 may have a fourth arm 288 that may be substantially a mirror image of the second arm 280. Thus, the fourth arm 288 may extend from the central portion 276 in a downward, generally linear direction. The fourth arm 288 may extend generally parallel the second arm 280 and/or the groove 262 extending along the second side bolster 244. In the current example, the third and fourth arms 286, 288 may generally define an obtuse angle between them.

In some embodiments, the area between the second and fourth arms 280, 288 may have at least one if not a plurality of apertures 260. The apertures 260 may assist in creating a degree of flexibility for the panel 120. The size, shape, location and number of apertures 260 may be varied to create a desired flexibility in the panel 120.

In some embodiments, the first and third arms 278, 280 may define an obtuse angle between them. The air flow opening 272 may be located between the first and third arms 278, 280.

In some embodiments, the cushioning member 122 may be located at least partially over the panel 120, such as at least partially over the upper surface 252 of the panel 120. The cushioning member 122 may extend in whole or in part across the bolsters 240, 242, 244 and/or the main support portion 178 of the panel 130. The cushioning member 122 may be the same or similar to the cushioning member 116.

The seat cover 118 may extend over at least a portion of the upper surface 252 of the panel 120, and the cover 118 may also extend over at least a portion of the cushioning member 122 as well. The seat cover 118 may be secured to the panel 120 as noted above. In doing so, the seat cover 118 may function to direct air. By way of example, it may be that when the cover 118 is secured to the panel 120 as noted above, the cover 118 prevents air from flowing past the retention features 186. Thus, the air may be trapped between the panel 120, the retention features 186 and the cover 118.

Heated or cooled air may be provided by a blower or fan connected to the air flow opening 272. The blower or fan may be located behind the panel 120.

In one embodiment, the air flows from the blower or fan, through the air flow opening 272 and into the air flow channel central portion 266. The air dissipates into the arms 278, 280, 286, 288 in equal or unequal amounts. The air may travel along the arms 278, 280, 286, 288 in whole or in part. As the air cannot escape through the arms 278, 280, 286, 288 and because it may be provided with a positive pressure, the air may move in an upward direction away from the panel 120.

Figure 13:
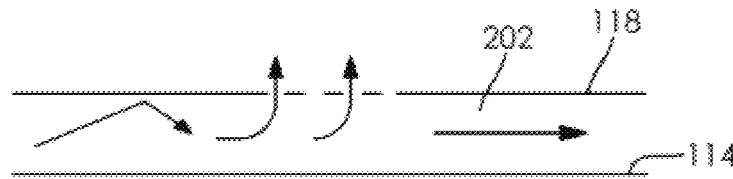
FIG. 13 is a partial sectional view showing a portion of the seat base assembly.

In such a case, the air may move through the cushioning member 122 (if one is used) where it meets the cover 118. The cover 118 may be provided with air apertures in selected portions of the cover 118 through which the air may flow so that it exits at least adjacent the occupant in desired locations. This may be appreciated from FIG. 13, which shows the seat base panel 114, but the same concept may apply to the seat back panel 120.

In other instances, the blower/fan may be reverse its direction so that it provides a negative pressure through the air apertures, the cushioning member 122 and the arms 278, 280, 286, 288. The air may be exhausted through the blower/fan beneath the seat assembly 100.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof.

The embodiments described above are therefore to be considered in all respects as illustrative, not restrictive.

What is claimed is:

1. A panel for a seat, comprising:
   a retention portion comprising a recessed seat cover groove, wherein said groove has at least one tooth adapted to selectively retain a seat cover in the groove;
   a plurality of recessed air flow channels;
   a rear bolster comprising a leading wall, a connecting wall and a trailing wall, wherein the leading wall has a first clamp portion and the trailing wall has a second clamp portion, the clamp portions adapted to selectively receive a frame connection member therein; and
   an air flow opening connected to a recessed air flow channel of the plurality of recessed air flow channels;
   wherein the air flow opening has an attachment feature for connection to a blower or fan.

2. The panel of claim 1, wherein the retention portion, the air flow channels and the rear bolster are one-piece, unitary and integrally formed.

3. The panel of claim 1, wherein the seat cover groove has a plurality of pairs of opposed teeth adapted to retain the seat cover in the seat cover groove, wherein the teeth are adapted to elastically flex in a first direction for an attachment member to be located between them and then the teeth are adapted to flex in a second direction, opposite the first direction, to selectively retain the attachment member within the seat cover groove.

4. The panel of claim 1, wherein a partial hemispherical rib extends inwardly from at least an inner surface of the connecting wall, said rib having at least a partially complementary shape to the frame connection member.

5. The panel of claim 1, wherein the first clamp portion and the second clamp portion have at least partially complementary shapes to the frame connection member.

6. The panel of claim 1, wherein the leading wall, the connecting wall and the trailing wall have a larger radius measured from said frame connection member than a radius between the frame connection member and the first and second clamp portions.

7. The panel of claim 1, wherein two apertures are defined between the leading wall and at least one rib, and two additional apertures are defined between the rib and the trailing wall.

8. The panel of claim 1, wherein said seat cover groove has a general U-shaped cross section, wherein a base of the seat cover groove is located below a lower surface of the panel.

9. The panel of claim 1, wherein the plurality of air flow channels are formed in part from walls extending downwardly from an upper surface of a main support portion of the panel, wherein the plurality of air flow channels comprise a lower surface and an open top opposite the lower surface; wherein the open top of the plurality of air flow channels is generally coplanar with the upper surface of the main support portion of the panel.

10. The panel of claim 1, wherein the plurality of air flow channels comprise a central portion from which at least one arm is in fluid communication.

11. The panel of claim 1, wherein the plurality of air flow channels comprise a first arm and a second arm recessed into a main support portion of the panel, wherein said arms define an obtuse angle between them.

12. The panel of claim 1, wherein the plurality of air flow channels comprise four arms that are symmetrical about a centerline of the panel.

13. The panel of claim 1, further comprising a fluid permeable cushioning material located over the panel, wherein the seat cover is located over the cushioning material, wherein the seat cover has selected gas permeable areas over the air flow channels and other areas of non-permeability.

14. The panel of claim 1, wherein the seat cover groove has a plurality of pairs of opposed teeth adapted to retain the seat cover in the seat cover groove, wherein the teeth extend from a bottom of the groove, wherein the plurality of pairs of opposed teeth are integrally formed with the panel.

15. The panel of claim 14, wherein the plurality of pairs of opposed teeth extend from the bottom of the seat cover groove.

16. The panel of claim 1, wherein the panel is formed of a thermoplastic material.

17. The panel of claim 1, wherein the air flow opening is configured for air flow into the recessed air flow channel of the plurality of recessed air flow channels.

18. The panel of claim 1, wherein the air flow opening extends from an upper surface of the panel to a lower surface of the panel.

* * * * *